United States Patent [19]

Mahler et al.

[11] 4,337,224
[45] Jun. 29, 1982

[54] APPARATUS FOR CONDUCTING THE CATALYTIC OXIDATION OF GASEOUS SULFUR COMPOUNDS TO SULFUR TRIOXIDE

[75] Inventors: Friedrich Mahler, Cologne; Adolf Stauffer, Pulheim, both of Fed. Rep. of Germany

[73] Assignee: Davy McKee Aktiengesellschaft, Cologne, Fed. Rep. of Germany

[21] Appl. No.: 237,211

[22] Filed: Feb. 23, 1981

[30] Foreign Application Priority Data

Feb. 23, 1980 [DE] Fed. Rep. of Germany ....... 3006900

[51] Int. Cl.³ .............................................. B01J 8/06
[52] U.S. Cl. .................................... 422/197; 165/161; 165/174; 165/175; 422/205; 422/236; 422/312; 423/533
[58] Field of Search ............... 422/196, 197, 201, 205, 422/236, 312; 165/159, 161, 173–175; 423/532, 533

[56] References Cited

U.S. PATENT DOCUMENTS

| 1,905,719 | 4/1933 | Jaeger | 422/205 X |
| 1,909,358 | 5/1933 | Jaeger | 422/205 X |
| 1,917,718 | 7/1933 | Jewett | 422/197 |
| 1,945,812 | 2/1934 | Jaeger | 422/197 |
| 2,855,449 | 10/1958 | Owen | 422/201 X |
| 4,127,389 | 11/1978 | Hackemesser et al. | 422/201 |

FOREIGN PATENT DOCUMENTS 2711897 1/1980 Fed. Rep. of Germany .
319459 1/1970 Sweden .............................. 422/201

Primary Examiner—Richard L. Chiesa
Attorney, Agent, or Firm—Millen & White

[57] ABSTRACT

In a reactor housing for conducting the catalytic oxidation of gaseous sulfur compounds, a plurality of empty tubes are arranged in an outer zone of the housing for having incoming gas to be reacted flow therethrough. Larger catalyst-filled tubes are arranged in an intermediate zone for having the gas flow therethrough after flowing through the empty tubes for performing the catalytic oxidation in the larger catalyst-filled tubes. An inner chamber includes an axial-flow pump arranged therein and is in communication with the outer and intermediate zones in such a way that a heat-transfer agent is caused to flow cross-currently into and out of the outer zone, intermediate zone and inner chamber for contacting the empty tubes and catalyst-filled tubes.

9 Claims, 1 Drawing Figure

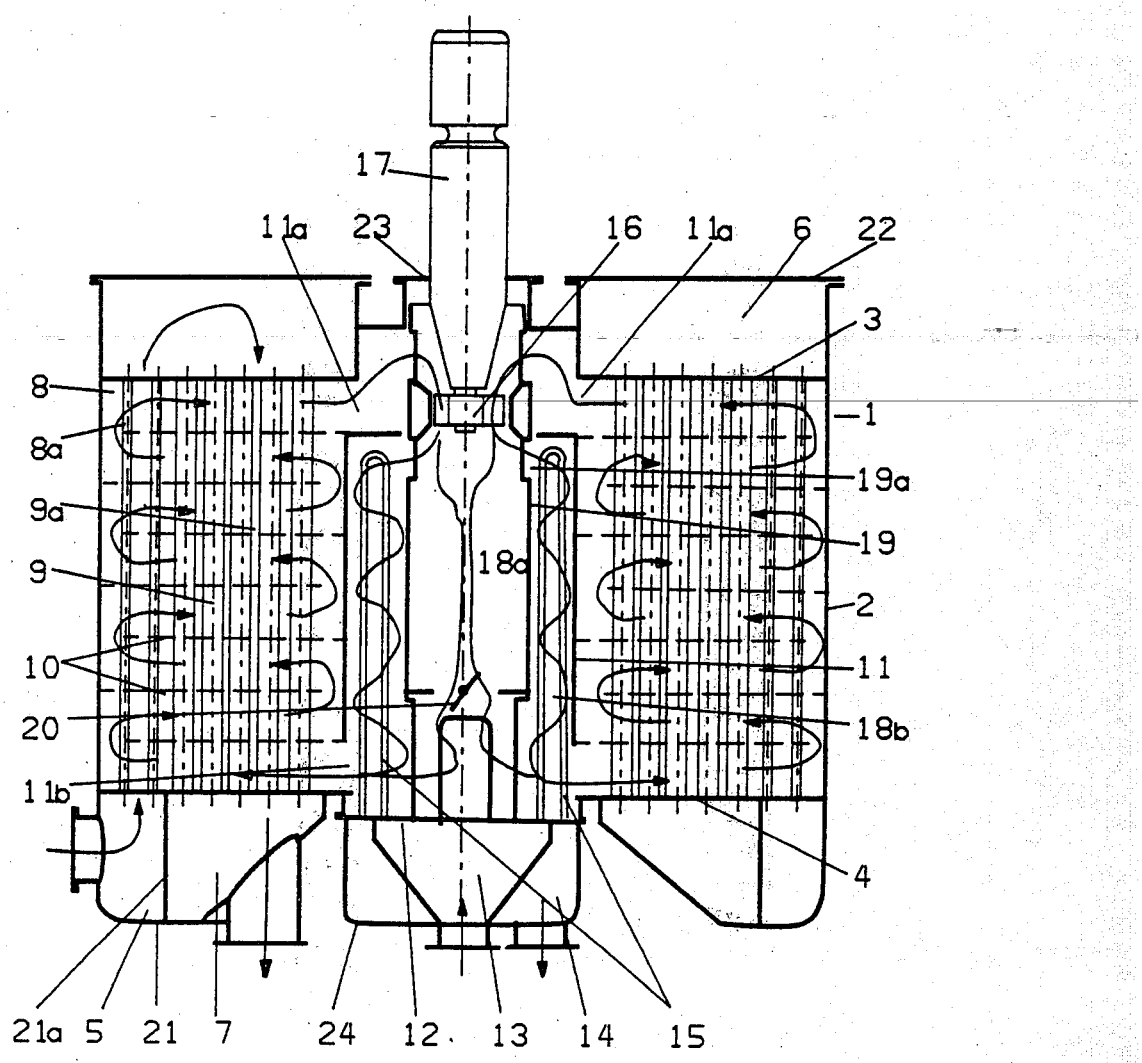

APPARATUS FOR CONDUCTING THE CATALYTIC OXIDATION OF GASEOUS SULFUR COMPOUNDS TO SULFUR TRIOXIDE

BACKGROUND OF THE INVENTION

The invention relates to an apparatus for conducting the catalytic oxidation of gaseous sulfur compounds, such as sulfur dioxide, to sulfur trioxide, comprising a reaction housing containing a plurality of tubes located between tube plates, and having domes for the feeding, guidance, and discharging of the reaction gas to and/or from individual tube groups. All of the tubes, or only a portion thereof, contain a catalyst, and all of the tubes are surrounded by a flow of liquid heat-transport agent. The apparatus of the invention relates to an apparatus such as is disclosed in West German Patent No. 2,711,897.

The apparatus according to the cited German patent is characterized in that individual tube groups are each associated with their own domes, or dome chambers defined within a dome by respective partitions. The domes or dome chambers with their catalyst-filled tube groups are connected in series with respect to the flow relationships, and the space around the tubes is filled with a liquid heat-transfer medium and is connected to a circulation system for the heat-transfer medium comprising at least one heat exchanger. In this conventional apparatus, the heat exchanger, which is the means for the removal of the sum total of the reaction heat developed in the reactor, is arranged outside of the reactor, and the heat-transport agent must be passed back and forth through pipelines between the reactor and the heat exchanger. This results in increased heat losses to the surroundings. In addition, it is difficult to maintain the temperature of the heat-transport agent flowing around the reactor tubes, and accordingly also the temperature of the reaction gas while flowing through the catalyst-filled tubes, within narrow limits.

SUMMARY OF THE INVENTION

It is an object of the present invention to provide an apparatus for conducting the catalytic oxidation of gaseous sulfur compounds, such as sulfur dioxide and/or hydrogen sulfide, to sulfur trioxide in an apparatus of the type discussed in the above-mentioned patent, wherein the heat losses of the circulating heat-transport agent to the surroundings, as well as the temperature fluctuations of the heat-transport agent in the reactor, are substantially reduced by a more compact construction.

In the apparatus of the invention this object is attained by providing that, between the tube plates, an outer zone is provided having tubes of a small diameter, a central zone adjoining thereto toward the inside is equipped with catalyst-filled tubes of a larger diameter, and an inner chamber is equipped at least partially with hairpin-shaped, empty tubes. The inner chamber is separated from the aforementioned central zone by a wall having upper and lower openings for the passage of the heat-transport agent, and the outer zone and the central zone are provided with plates common to both for guiding the heat-transport agent in crosscurrent relationship with respect to the tubes. An axial-flow pump is arranged in the inner chamber for circulating the heat-transport agent through the outer and central zones and through the inner chamber. The gases to be reacted flow initially through the empty tubes of the outer annular zone and are therein preheated to the reaction temperature by the heat-transport agent flowing around these tubes. The gases are then guided in the deflection dome into the catalyst-filled tubes of the central annular zone and reacted therein, during which step the heat-transport agent absorbs a substantial part of the heat of reaction and thus, serves as the coolant for the reaction gas. By the guide baffles, the heat-transport agent is guided during upward flow in the outer and inner zones alternatingly toward the outside and again toward the inside, so that heat is continuously transferred from the catalyst-filled tubes of the central zone to the empty tubes of the outer zone and thereby, the temperature rise in the catalyst tubes is kept within narrow limits. The hairpin tubes in the inner chamber have the function attributed in the apparatus of the invention which in the cited German patent is attributed to the externally located heat exchanger. In the invention, by the arrangement of the heat exchanger centrally within the reactor, the heat losses to the surroundings are more substantially reduced. Another contributing factor for the low heat losses to the surroundings is also that the outer tube zone only serves for preheating the reaction gas, and the heat-transport agent has a relatively low temperature with the provided crosscurrent guidance on the outer shell of the reactor. The low heat losses are especially advantageous for keeping the reactor hot during idle periods. It is furthermore advantageous that, after a stoppage of the reactor while keeping it hot, both tube groups are available at approximately the operating temperature. The excess heat produced in the reactor is transferred from the heat-transport agent circulating through the inner chamber to the flow medium circulating through the hairpin tubes, such as, for example, a gas or steam. The cooling effect can be adjusted as desired in the inner chamber by the velocity of the flow medium in the hairpin tubes. The use of a liquid heat-transport agent makes it possible to withdraw a considerably greater amount of heat from the reactor than attained in the heretofore customary gas/gas heat exchangers, and consequently, the reactor can be utilized in the reaction of gases having high $SO_2$ and/or $O_2$ concentrations heretofore unusual (for example 20–60% by volume of $SO_2$ and/or 20–70% by volume of $O_2$).

According to the preferred embodiment of the invention, a central chamber free of tubes is segregated in the inner chamber from the annular chamber equipped with the hairpin tubes, by means of a wall, and a throttle valve or the like is arranged in the zone of the central chamber for adjusting the partial stream of heat-transport agent circulating through the central chamber. In this way, an axial flow path in the manner of a bypass is created within the inner chamber for the flow of heat-transport agent, along which the heat-transport agent is not cooled. By means of the throttle valve, the proportion of the amount of heat-transport agent circulating without cooling through the axial flow path with respect to the amount of heat-transport agent circulating and with cooling through the annular chamber, can be varied and thus, the heat transferred from the reactor to the coolant flowing in the hairpin tubes can be altered. In this embodiment, apertures for the entrance of the heat-transport agent are suitably arranged in the upper region of the wall, and an opening with the throttle valve is located in the bottom.

Preferably, the axial-flow pump is disposed in the region of the upper apertures of the wall between the central zone and the inner chamber so that the pump takes in the heat-transport agent through the apertures and urges same into the inner chamber. The heat-transport agent flows, in this embodiment, downwardly in the inner chamber and in crosscurrent fashion upwardly in the central and outer zones. The arrangement of the pump in the region of the upper apertures makes it easy to disassemble the pump.

Preferably, the axial-flow pump is flanged centrally to the reactor housing and can preferably be pulled out of the reactor axially in the upward direction. Repair work on the pump can be readily performed in this construction.

Suitably the hairpin tubes in the inner chamber are mounted to a central bottom plate, this plate being flanged in the middle to the reactor housing and being preferably removable from the housing in the downward direction. By this arrangement, the hairpin tubes as well as the wall separating the central chamber from the annular chamber equipped with hairpin tubes can be pulled out of the reactor together with the throttle valve, so that cleaning and repair work, for example on the throttle valve, can be conducted without effort.

Furthermore, the lower tube plate is suitably covered in the outer and central regions by a common dome subdivided by an internal partition into an influx chamber for the empty tubes of the outer zone and into an efflux chamber for the catalyst-filled tubes of the central zone. The influx and efflux chambers are preferably located at the lower tube plate, whereas the dome on the upper tube plate serves for the guidance of the preheated gaseous stream. It is, of course, also possible to provide at the lower tube plate, in place of the dome subdivided by a partition into the influx and efflux chambers, an annular influx dome covering the empty tubes and an annular efflux dome covering the catalyst-filled tubes which are separate from each other.

BRIEF DESCRIPTION OF THE DRAWINGS

The invention will be described in greater detail below with reference to the drawing wherein the preferred embodiment of the reactor according to this invention is shown in an axial sectional view.

DETAILED DISCUSSION OF THE INVENTION

The reactor 1 illustrated in the drawing comprises, in a housing 2, an upper tube plate 3 with an annular deflection dome 22 and a lower tube plate 4 with an annular dome 21 subdivided by a partition 21a into an annular influx chamber 5 and an annular efflux chamber 7. Between the tube plates 3 and 4, relatively thin, empty tubes 8a extend in an outer zone 8, and catalyst-filled tubes 9a having a larger diameter extend in a central zone 9. In the chambers 8 and 9, several horizontally extending guide plates 10 are arranged ensuring a crosscurrently guided flow of the heat-transport agent flowing around the tubes 8a and 9a in correspondence with the illustrated direction of the arrows.

The central zone 9 is separated from the inner chamber 18 by a cylindrical wall 11; the chamber 18, in turn, is subdivided by a cylindrical wall 19 into an annular chamber 18b equipped with hairpin tubes 15 and into a central chamber 18a devoid of tubes. The wall 11 exhibits passage apertures 11a and 11b, respectively, at the top and at the bottom, for the heat-transport agent. Furthermore, passage openings 19a are to be arranged in the upper zone of the cylindrical wall 19, whereas a throttle valve 20 is provided in the bottom of the wall 19. An axial-flow pump 16 with drive motor 17 is connected to the reactor housing 2 between the annular dome 22 by means of a flange 23. Similarly, a bottom plate 12 is flanged in place within the annular dome 21; toward the inside, the hairpin tubes 15 and the cylindrical wall 19 with throttle valve 20 are attached to this plate and, toward the outside, the dome 24 is mounted to this plate with the central influx chamber 13 for the coolant flowing through the hairpin tubes 15 and with the annular efflux chamber 14.

During operation, the gases to be reacted flow through the inlet nipple of the influx chamber 5 into the empty tubes 8a, wherein they are preheated by the heat-transport agent flowing around the tubes. The gases are then deflected in the chamber or dome 6, flow through the catalyst-filled tubes 9a wherein the reaction takes place, and the gases are cooled by the heat-transport agent flowing around the tubes 9a. The reaction gases leave the reactor through the nipple of the efflux chamber 7. The heat-transport fluid is guided during its path upwardly through the space between the outer wall 2 and the wall 11 by means of the plates 10 alternatingly toward the outside and toward the inside, so that thereby a multiple heat exchange is obtained between the heat-transmitting, catalyst-filled tubes 9a and the heat-absorbing, empty tubes 8a. The temperature rise of the reaction gas in the tubes 9a, as well as of the heat-transport agent on its way from the apertures 11b through the zones 8 and 9, to the apertures 11a, is consequently low. The heat-transport agent is taken in by the axial-flow pump 16 through the openings 11a and urged into the inner chamber 18, the stream of heat-transport agent being subdivided, in correspondence with the position of the throttle valve 20, into an uncooled central stream through the central chamber 18a and into a cooled annular stream through the annular chamber 18b. The cooling of the heat-transport agent in the annular chamber 18b is effected by the hairpin tubes 15 which are fed with coolant, e.g. steam or cooling gas, through the central chamber 13 of the dome 24. The uncooled partial stream through the central chamber 18a is combined on the downstream side of the throttle valve 20 again with the cooled partial stream from the annular chamber 18b and then again flows through the apertures 11b into the tube bundle zones 8 and 9.

It is possible to move the pump 16 with its drive motor 17, on the one hand, and the hairpin tubes 15 with the wall 19 and the throttle valve 20, on the other hand, out of the inner chamber 18 of the reactor, so that servicing and repair are readily possible. The reactor of this invention is distinguished by low heat losses and, as compared with the heretofore utilized bundle-type reactors with externally located heat exchangers, exhibits the advantage that the entire excess heat liberated in the reactor is transferred in a heat exchanger to a flow medium and consequently is available again in a total amount.

We claim:

1. In an apparatus for conducting the catalytic oxidation of gaseous sulfur compounds to sulfur trioxide comprising a reactor housing containing a plurality of tubes arranged between tube plates, said housing having domes at each end for feeding, guiding, and discharging the reaction gas to and from individual tube groups, at least a portion of said tubes containing a catalyst therein, and all of said tubes arranged for being surrounded and contacted by the flow of a liquid heat-transport agent, the improvement comprising:

an outer zone (8) having empty tubes (8a) arranged therein between an upper tube plate (3) and a lower tube plate (4);

an intermediate zone (9) adjacently adjoining said outer zone (8) toward the interior of the housing, and having catalyst filled tubes (9a) arranged therein;

wall means (11) defining an inner chamber (18a, 18b) and separating said inner chamber (18a, 18b) from said intermediate zone, said wall means (11) having upper openings (11a) and lower openings (11b) for allowing passage of the heat transport agent therethrough;

plate means (10) common to both the outer zone (8) and the intermediate zone (9) for guiding the flow of the heat transport agent cross-currently around and in contact with empty tubes (8a) and catalyst-filled tubes (9a); and axial flow pump means (16) arranged in said inner chamber for causing the heat transport-agent to circulate throughout the outer and intermediate zones (8, 9) and through the inner chambers (18a, 18b).

2. An apparatus according to claim 1, wherein said inner chamber (18a, 18b) comprises a central chamber (18a) devoid of tubes and separated by a wall (19) from an annular chamber (18b) having hairpin tubes (15) located therein; and further comprising throttle valve means (20) arranged within the central chamber (18a) for adjusting the partial stream of the heat-transport agent circulating through the central chamber (18a).

3. An apparatus according to claim 2, wherein apertures (19a) for the passage of the heat-transport agent are arranged in the upper region of the wall (19), and the throttle valve means (20) is disposed in the bottom of the central chamber.

4. An apparatus according to claim 1, wherein the axial-flow pump means (16) is arranged in the region of the upper openings (11a) of the wall means (11) in such a way that the heat-transport agent flows through the openings (11a) into the axial-flow pump means (16) and is caused to flow into the inner chamber (18a, 18b).

5. An apparatus according to claim 1, adapted for causing the circulation of the heat-transport agent to be oriented downwardly in the inner chamber (18a, 18b) and, in total, upwardly in the outer and central zone (8, 9).

6. An apparatus according to claim 1, wherein the axial-flow pump means (16) further comprises flange means attaching said axial-flow pump means (16) centrally within the reactor housing (2), and said flange means being such that said axial-flow pump means can be pulled out of the reactor preferably axially in the upward direction.

7. An apparatus according to claim 1, wherein said lower tube plate (4) is covered in the region of the outer and intermediate zones (8, 9) by a common dome (21), said common dome (21) being subdivided by an internal partition (21a), into an influx chamber (5) for the empty tubes (8a) of the outer zone (8), and an efflux chamber (7) for the catalyst-filled tubes (9a) of the intermediate zone (9).

8. An apparatus according to claim 1, wherein the hairpin tubes (15) are arranged on a central bottom plate (12) having a flange connecting it centrally within the reactor housing (2), preferably in such a way that it can be removed out of the housing in the downward direction.

9. An apparatus according to claim 1, wherein said lower tube plate (4) is covered in the region of the outer and intermediate zones (8, 9) by a common dome (21), said common dome (21) being subdivided by an internal partition (21a), into an influx chamber (5) for the empty tubes (8a) with said empty tubes having a smaller diameter relative to said catalyst-filled tubes (9a), and an efflux chamber (7) for the catalyst-filled tubes (9a) of the intermediate zone (9).

* * * * *